US011103995B2

(12) United States Patent
Shaw et al.

(10) Patent No.: US 11,103,995 B2
(45) Date of Patent: *Aug. 31, 2021

(54) ON-DEMAND ROBOT VIRTUALIZATION

(71) Applicant: AT&T Intellectual Property I, L.P., Atlanta, GA (US)

(72) Inventors: Venson Shaw, Kirkland, WA (US); Jeffrey Joseph Farah, North Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/284,570

(22) Filed: Feb. 25, 2019

(65) Prior Publication Data

US 2019/0184558 A1 Jun. 20, 2019

Related U.S. Application Data

(63) Continuation of application No. 15/226,259, filed on Aug. 2, 2016, now Pat. No. 10,259,117.

(51) Int. Cl.
*B25J 9/00* (2006.01)
*B25J 9/16* (2006.01)
*G06F 9/455* (2018.01)

(52) U.S. Cl.
CPC ........ *B25J 9/1661* (2013.01); *G06F 9/45558* (2013.01); *G05B 2219/33125* (2013.01); *G05B 2219/40264* (2013.01); *G06F 2009/4557* (2013.01)

(58) Field of Classification Search
CPC ..... B25J 9/161; B25J 9/1661; G06F 9/45558; G06F 2009/4557
See application file for complete search history.

(56) References Cited

U.S. PATENT DOCUMENTS

| | | | |
|---|---|---|---|
| 8,380,349 B1 | 2/2013 | Hickman et al. | |
| 8,386,078 B1 | 2/2013 | Hickman et al. | |
| 8,406,926 B1 | 3/2013 | Lewis | |
| 8,532,820 B1 | 9/2013 | Sampath | |
| 8,639,644 B1 | 1/2014 | Hickman et al. | |
| 8,830,057 B1* | 9/2014 | Poursohi | G08B 21/182 340/540 |
| 8,972,055 B1 | 3/2015 | Desai et al. | |
| 8,977,409 B2 | 3/2015 | Lee et al. | |
| 9,014,848 B2* | 4/2015 | Farlow | B25J 11/009 700/245 |
| 9,026,248 B1 | 5/2015 | Hickman et al. | |
| 9,216,509 B2 | 12/2015 | Renkis | |
| 2012/0197439 A1* | 8/2012 | Wang | B25J 11/009 700/259 |

(Continued)

FOREIGN PATENT DOCUMENTS

| | | |
|---|---|---|
| CN | 102437601 A | 5/2012 |
| WO | WO 2014/204615 A2 | 12/2014 |

(Continued)

OTHER PUBLICATIONS

Aguero et al.; "Inside the Virtual Robotics Challenge: Simulating Real-Time Robotic Disaster Response"; IEEE Transactions on Automation Science and Engineering; vol. 12 No. 2; Apr. 2015; p. 494-506.

(Continued)

*Primary Examiner* — Ian Jen
(74) *Attorney, Agent, or Firm* — BakerHostetler

(57) ABSTRACT

Robots may be instantiated on-demand and may be adaptive in response to an environment, application, or event change. The adapted robot may switch functions in order to perform selective operations within medicine, agriculture, military, entertainment, or manufacturing, among other things.

20 Claims, 10 Drawing Sheets

(56) References Cited

U.S. PATENT DOCUMENTS

| | | | | |
|---|---|---|---|---|
| 2013/0115974 | A1* | 5/2013 | Lee | H04W 4/025 455/456.5 |
| 2013/0283298 | A1* | 10/2013 | Ali | G06F 9/5077 719/319 |
| 2013/0325244 | A1* | 12/2013 | Wang | G06T 11/00 701/26 |
| 2014/0074286 | A1* | 3/2014 | Geheb | B25J 9/1674 700/245 |
| 2014/0150806 | A1 | 6/2014 | Hu et al. | |
| 2015/0262102 | A1 | 9/2015 | Tann | |
| 2015/0314438 | A1 | 11/2015 | Namba et al. | |
| 2015/0378356 | A1 | 12/2015 | Hefeeda et al. | |
| 2016/0005229 | A1* | 1/2016 | Lee | G06F 3/0488 345/419 |
| 2016/0023351 | A1 | 1/2016 | Kuffner et al. | |
| 2016/0031081 | A1 | 2/2016 | Johnson | |
| 2016/0094700 | A1* | 3/2016 | Lee | H04W 8/245 455/419 |
| 2016/0121479 | A1 | 5/2016 | Lin et al. | |
| 2016/0121487 | A1 | 5/2016 | Mohan et al. | |
| 2016/0127863 | A1* | 5/2016 | Yoon | H04M 3/42348 455/456.3 |
| 2016/0234668 | A1* | 8/2016 | Lee | H04W 4/90 |

FOREIGN PATENT DOCUMENTS

| | | |
|---|---|---|
| WO | WO 2015/143173 A2 | 9/2015 |
| WO | WO 2015/158880 A1 | 10/2015 |
| WO | WO 2016/014137 A2 | 1/2016 |
| WO | WO 2016/069394 A1 | 5/2016 |

OTHER PUBLICATIONS

Arumugam et al.; "DAvinCi: A Cloud Computing Framework for Service Robots"; 2010 IEEE Int'l Conf. on Robotics and Automation; Anchorage Convention District; p. 3084-3089.

Chen et al.; "Robot as a Service in Cloud Computing"; 2010 Fifth IEEE Int'l Symposium on Service Oriented System Engineering; p. 151-158.

Goldberg et al.; Cloud Robotics and Automation: A Survey of Related Work; Electrical Engineering and Computer Sciences; University of California at Berkeley; Technical Report No. UCB/EECS-2013-5; Jan. 27, 2013; 12 pages.

Hu et al.; "Cloud Robotics: Architecture, Challenges and Applications"; IEEE Network; 2012; p. 21-28.

Kamei et al.; "Cloud Networked Robotics"; IEEE Network; 2012; 25 pages.

Kehoe et al.; "A Survey of Research on Cloud Robotics and Automation"; IEEE Transactions on Automation Science and Engineering; vol. 12 No. 2; Apr. 2015; p. 398-409.

Mahmoud; "UAV-Cloud: A Platform for UAV Resources and Service on the Cloud"; United Arab Emirates University; Theses; May 2015; 105 pages.

Quintas et al.; "Cloud Robotics: Towards Context Aware Robotic Networks"; Proceeding of IASTED, the 16.sup.th IASTED Int'l Conf. on Robotics; 2011.

"Chapter 44—Networked Robots: from Telerobotics to Cloud Robotics"; http://faculty.cs.tamu.edu/dzsong/pdfs/044NetworkedRobots.pdf; accessed Oct. 17, 2016; 30 pages.

\* cited by examiner

ON-DEMAND ROBOT VIRTUALIZATION

CROSS REFERENCE TO RELATED APPLICATIONS

This application is a continuation of, and claims priority to, U.S. patent application Ser. No. 15/226,259 filed Aug. 2, 2016, entitled "On-Demand Robot Virtualization," the entire contents of which are hereby incorporated herein by reference.

TECHNICAL FIELD

The technical field generally relates to virtualization and, more specifically, to systems and methods for robot virtualization.

BACKGROUND

A robot is a mechanical or virtual artificial agent, usually an electromechanical machine that is guided by a computer program or electronic circuitry, and thus a type of an embedded system. Robots have been widely used today for wide range of industries (e.g., oil drilling, factory automation, underwater discovery, etc.). Conventional robots require dedicated and special purpose hardware/software resource which impose significant limitation. Conventional robots lacks flexibility and are incapable to adapt when environment, application, and event changes.

SUMMARY

Robots may be instantiated on-demand and may be adaptive in response to an environment, application, or event change. The adapted robot may switch functions in order to perform selective operations within medicine, agriculture, military, entertainment, or manufacturing, among other things.

In an example, an apparatus may include a processor and a memory coupled with the processor that effectuates operations. The operations may include receiving information associated with a location, the information comprising information from a sensor; determining a type of event based on the information; determining that the type of event is a robot actionable event; determining, based on the event, specifications for a robot; selecting a virtual machine based on the specifications for the robot; and providing instructions to activate the virtual machine to control the robot.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects of the herein described telecommunications network and systems and methods for antenna switching based on device position are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. When practical, like numbers refer to like elements throughout.

DETAILED DESCRIPTION

Figure 1:
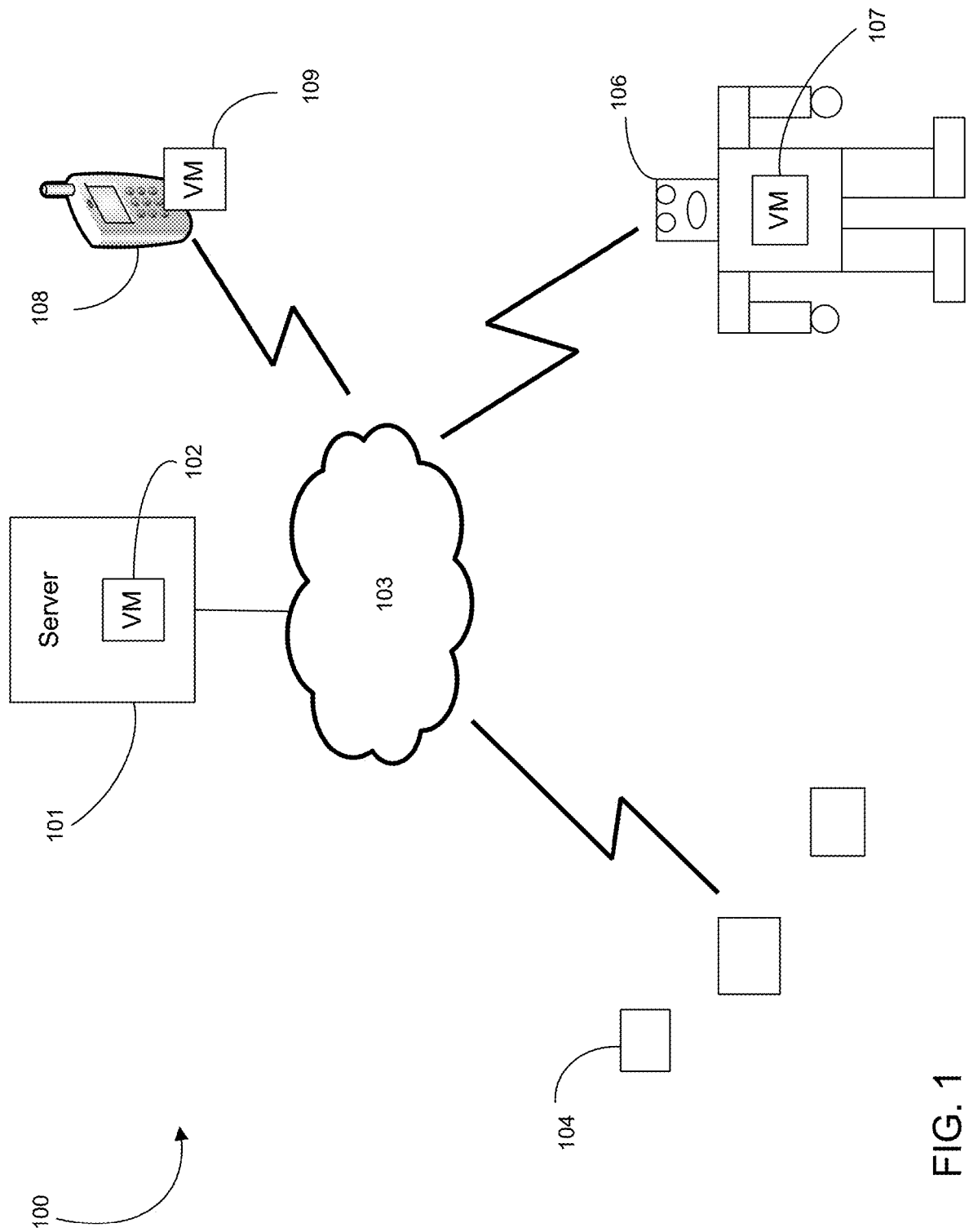
FIG. 1 illustrates an exemplary system for on-demand robot virtualization.

Disclosed herein are methods, systems, and apparatuses for on-demand robot virtualization. Robots may be instantiated on-demand and may be adaptive to an environment, application, or event change. FIG. 1 illustrates an exemplary system 100 for on-demand robot virtualization. Server 101 may be communicatively connected via network 103 to sensor 104, robot 106, or mobile device 108. Examples of mobile device 108 may be a tablet, smartphone, or laptop. In system 100, as discussed herein, there may be multiple virtual machines located within different devices, such as virtual machine 102, virtual machine 107, or virtual machine 109. Virtual machines may encapsulate a complete set of virtual hardware resources, including an operating system and all its applications, inside a software package. Virtual machines may be different identities that comprise functions for that identity (e.g., police officer, bank teller) Sensor 104 may be an accelerometer, gyroscope, magnetometer, light sensor, temperature sensor, motion sensor, or GPS, among others. Sensor 104 may be located in or outside a structure, located in or on robot 106, located in or on mobile device 108, or the like.

Robot 106 may be any type of robot (e.g., bipedal or quadrupedal; autonomous or non-autonomous), but preferably a humanoid robot. In general, humanoid robots may have a torso, a head, two arms, and two legs, but it is contemplated that some forms of humanoid robots may model only part of the body, such as from the waist up or just an arm(s). A robot may be defined an actuated mechanism programmable in two or more axes with a degree of autonomy, moving within its environment, to perform intended tasks. See ISO 8373:2012(en) (incorporated by reference in its entirety). An autonomous robot is a robot that performs behaviors or tasks with a high degree of autonomy, which is particularly desirable in fields such as space exploration, household maintenance (such as cleaning), waste water treatment and delivering goods and services. A fully autonomous robot may: gain information about the environment; work for an extended period without human intervention; move a part of itself throughout its operating environment without human assistance; and avoid situations that are harmful to people, property, or itself unless those are part of its design specifications.

Figure 2:
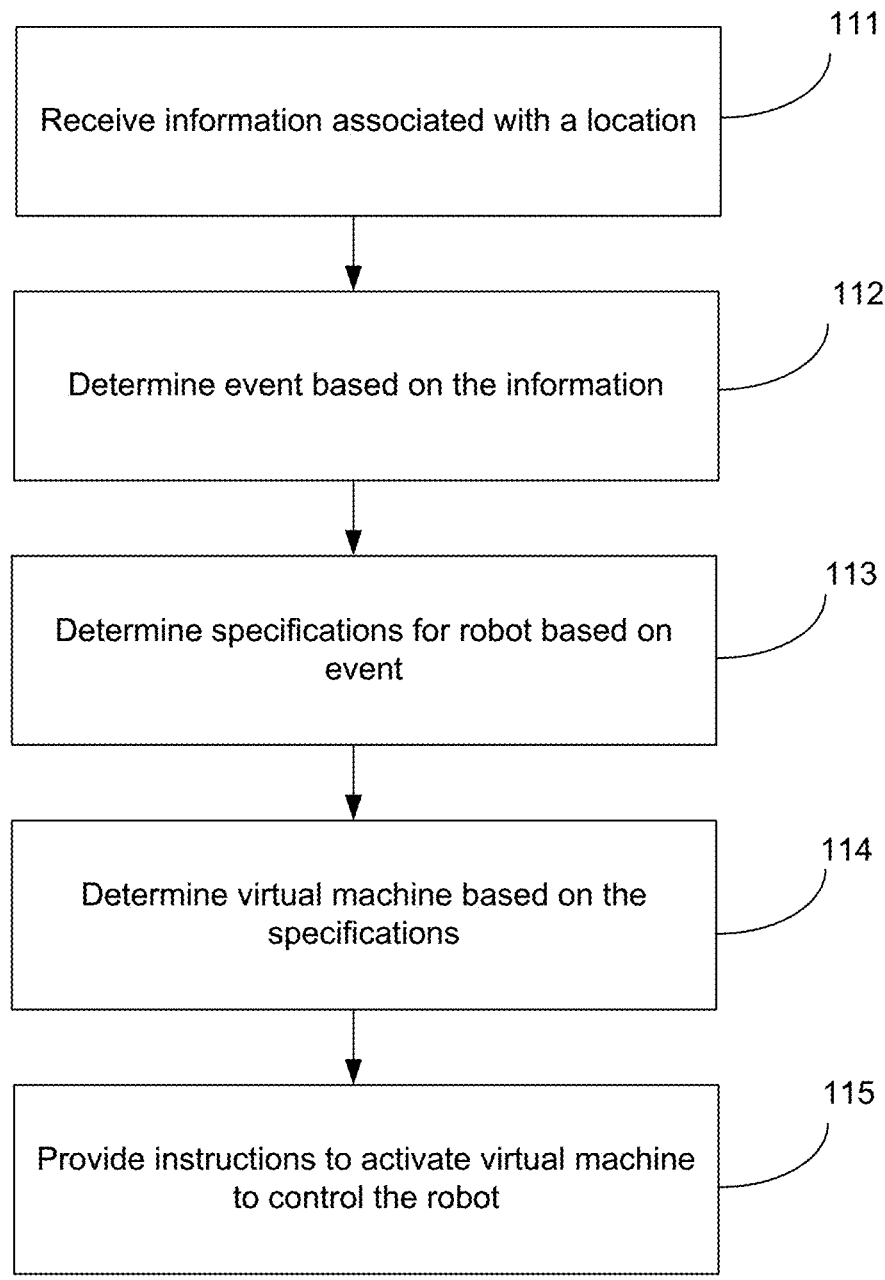
FIG. 2 illustrates an exemplary method for on-demand robot virtualization.

FIG. 2 illustrates an exemplary method for on-demand robot virtualization. At step 111, server 101 may receive information associated with a location. For example information associated with a location may include information from sensor 104 near the location, information from mobile device 108 (e.g., request for use of robot 106 in a particular manner—emergency or errand), information from robot 106 (e.g., sensor information or request based on determined status of location), or other information (e.g., time, date). At step 112, sever 101 may determine, based on the information, a type of event (e.g., robbery, user request, medical emergency, fire, etc.). The event may be within a predetermined category which indicates that the event is appropriate for a robot (i.e., robot actionable event). A robot actionable event may be predetermined by a user. A robot actionable event may be based on a certain threshold level being met or other triggers. In a first example, a threshold level may include a detected number of people in an area. The detected number of people may indicate a possible need for a crowd control operation by robot 106 or may indicate a possible need for an extra cashier to assist at customer checkout. In the first example, it is contemplated that there may be several considerations made in addition to the number of people, such as location of event or time of day. In a second example, information may include a number of people, body language or facial expressions of the people, and number of balloons. For this example, consideration of the information may indicate that a celebration (e.g., birthday party) is occurring and trigger robot 106 to be a clown (e.g., juggles or inflates balloons).

At step 113, as eluded to in step 112, based on the event, server 101 may determine desired specifications of robot 106. Server 101 may have a list of minimum to ideal specifications for robot 106 to have for the type of event. Revisiting the first example above, robot 106 may need to be a threshold height in order to be visible by the crowd, have threshold audio capabilities in order to be heard by the crowd, and threshold communication capability (e.g. SMS, MMS, voice over IP, etc.) in order to coordinate with other robots or people that may be assisting or desire to assist with crowd control. Specifications desired for robot 106 may be software or hardware related, which may include software versions, battery (e.g., current battery life, battery power output, estimated battery life to perform anticipated actions, etc.), antennas, processor speed, amount of memory, speed of robot 106, payload capacity (e.g., carrying a person or thing), types of sensors of robot 106, lights, actuators, or the like. The specifications may also apply to mobile device 108.

With continued reference to FIG. 1, at step 114, virtual machine 102 may be generated or selected based on the event, based on the control functions, or based on the specifications (desired or actual) of robot 106. At this step 114, server 101 may consider the control functions (e.g., the hardware or software functions used to perform certain actions, such as lift an object) to select or generate an appropriate virtual machine 102. At step 115, instructions are provided to activate virtual machine 102 to control robot 106.

There are several scenarios in which the virtual machine 102, 107, or 109, such as in step 114 and step 115, may be used for on-demand robot virtualization. In a first scenario, virtual machine 102 may remotely control robot 106. Server 101 may turn off or switch the virtual machines to correspond to different events (e.g., police officer virtual machine may be switched to cashier virtual machine). In a second scenario, virtual machine 107 may reside on robot 106 (e.g., an installed instance of virtual machine 107). Virtual machine 107 may be one of a plurality of virtual machines on robot 106 that is activated as needed (e.g., step 115). The other virtual machines on robot 106 may be in memory as file, but not an installed instance. Virtual machine 107 may be in a zipped or non-installed state and be alerted to uninstall via step 115 and become an installed instance. Server 101 may transfer virtual machine 107 to robot 106 after the control function is determined. In a third scenario, server 101 may send the software for virtual machine 107, but in this scenario robot 106 may be used to carry the software of virtual machine 107 to another robot (not shown) that is the ultimate attended user of the virtual machine 107. Robot 106 may physically connect (e.g., USB) with the other robot or wirelessly connect with the other robot. This method may be used based on security concerns and budgetary reasons (e.g., only one robot has sufficient security to download and transmit in order to keep costs down). Signal strength may help determine selected virtual machines or how much of an identity is downloaded. For example, there may be different levels of an identity downloaded based on signal strength at current location of robot 106 or anticipated signal strength for an area robot 106 will traverse.

Additional scenarios associated with virtual machines are discussed below. In a fourth scenario, server 101 may send the software for virtual machine 107 to mobile device 108, but in this scenario mobile device 108 may be used to carry the software of virtual machine 107 to robot 106 that is the ultimate intended user of virtual machine 107 (e.g., installed instance of virtual machine 107). Mobile device 108 may be physically connected (e.g., USB—universal serial bus) with robot 106, wirelessly connected with robot 106, or a memory of mobile device 108 may be inserted into robot 106. The user associated with mobile device 108 may be authorized to instruct/direct robot 106. In a fifth scenario, server 101 may send or activate virtual machine 109. Virtual machine 109 may also already be present on mobile device 108 and activated by an associated user of mobile device 108. In this scenario, mobile device 108 may be used to wirelessly connect with robot 106 and use virtual machine 109 to control robot 106. Robot 106 may act as a physical extension of virtual machine 109 on mobile device 108. Exemplary use cases for the mobile device 108 scenarios (and other scenarios) may include consumer use of robot 106 in pushing a grocery cart or mowing a lawn (e.g., personal service robot). A consumer may pay to use robot 106 in the scenarios discussed herein. The payment may be via website payments or convenient mobile payments (e.g., "mobile wallet" via near field communication—NFC). In emergency situations, payment may not be needed just the dialing of 911 and communicatively connecting with robot 106. Dialing 911 may connect mobile device to voice call with emergency personnel, but also may broadcast an emergency alert to nearby robots, which may assist in locating mobile device 108. Robot 106 may automatically report its location in this emergency situation. Mobile device 108 may be physically (e.g., wired/inserted) connected or wirelessly connected with robot 106 then 911 may be dialed to indicate an emergency. There may be a default emergency related virtual machine (e.g., police, fire) loaded on mobile device 108 or robot 106 for quick access.

Further considerations associated with on-demand robot virtualization are discussed below. Robot 106, before installation of a virtual machine, may have base level functions, such as responding to name or digitally displaying information. As discussed herein, robots may be changed from one identity to the next (e.g., police officer mode to bank teller mode). A display on robot 106 may communicate the mode (i.e., virtualized function) based on text, a color, a picture, or video (e.g., "POLICE OFFICER"). The display of robot 106 (not shown) may be located on forehead (or other portions of face), on back of head, torso (e.g., chest), or back (e.g., upper back) of robot 106.

Location or detection of wireless signals may be used to help restrict functions and make robot 106 more secure. Geofences may be used create a boundary for the use of robot 106. A geofence is a virtual barrier. Programs that incorporate geo-fencing allow an administrator to set up triggers so when a device enters (or exits) the boundaries defined by the administrator, an action is taken, such as a SMS message is sent, email alert is sent, a siren goes off. In an example, if robot 106 reaches a geofence boundary it may shutoff, move back towards the center of the geofence, or otherwise stop moving. In another example, the geofence may restrict robot 106 to a particular set of identities. Robot 106 may have identity A and be allowed to use identity A in geofence Y (not shown), but not in geofence Z (not shown). So if robot 106 enters into geofence Z, robot 106 may immediately shutdown. Alternatively, if robot 106 enters in geofence Z, robot 106 may be allowed in geofence Z with identity A for a short period (e.g., 30 minutes). Once the period is expired, robot 106 may shutdown, resort to a default identity and return to geofence Y, or a number of other alternatives. It is contemplated that this may be particularly useful with jurisdictional issues, for example with police or other public safety. Geofences may be determined based on the detection of wireless radio or light signals or GPS, among other things.

Wireless signaling technology (e.g., radio, infrared, ultrasonic) may be used to restrict the use of robot 106. A wireless technology may be selected based on a determined function. In an example, if robot 106 is in a mode as an assistant of a user associated with mobile device 106, then Bluetooth may be used to keep robot 106 from roaming away. But if robot 106 is in a mode as a security guard, WiFi may be used to keep robot 106 in or near the building. If leaves the range of the wireless technology it may trigger a shutdown, sending of an alert message, or the like response.

A virtual machine (e.g., system virtual machine or process virtual machine) is a software implementation of a machine (for example, a computer) that executes programs like a physical machine. It is contemplated herein that virtual machine 102, virtual machine 107, or virtual machine 109 may be a self-contained identity (e.g., police officer, cashier, teacher, etc.) for robot 106. Terms identity or mode are generally used interchangeably herein. The methods, systems, and apparatuses discussed herein associated with on-demand robot virtualization, in which designated functions (e.g., officer) are constrained to robot 106, may make for a safer, more reliable, and efficient use of resources. Virtual robots are considered herein as well. Virtual robot may be digital construction of a physical robot in a virtual world (e.g., Second Life). The virtual robot may interact and be affected by other digital constructions (e.g., digital doors) just as it would in a physical world.

Virtual machines can be isolated software containers, operating independent of other virtual machines. Such isolation can assist in realizing virtual-machine-based virtual environments that can execute applications and provide services with availability, flexibility, and security, in some cases, surpassing those on traditional, non-virtualized systems. Virtual machines can encapsulate a complete set of virtual hardware resources, including an operating system and all its applications, inside a software package. Encapsulation can make virtual machines quite portable and manageable.

Indeed, virtual machines can be hardware-independent, and can be portably provisioned and deployed on one of multiple different computing devices, operating systems, and environments. Indeed, depending on the availability of computing devices within a cloud environment (e.g., server 101) a particular virtual machine 102 may be provisioned on any one (or multiple) of the devices included in cloud environment 101.

In some instances, a virtual machine manager (not shown) may be provided in connection with a cloud computing system (e.g., 101) (or other system hosting virtual infrastructure). Virtual machine managers, or hypervisors, may be implemented as software- and/or hardware-based tools used in the virtualization of hardware assets (i.e., as virtual machines 102) on one or more host computing devices (e.g., server 101). A virtual machine manager may be used to run multiple virtual machines (e.g., 102), including virtual machines with different guest operating systems, on one or more host computers (e.g., server 101). The virtual machine manager may provide a shared virtual operating platform for multiple virtual appliances and guest operating systems and enable a plurality of different virtual machines (and guest operating systems) to be instantiated and run on computing devices and hardware hosting virtual infrastructure (e.g., robot 1061 or mobile device 108). Further, virtual machine managers, in some instances may be run natively, or as "bare metal," directly on host computing devices' hardware to control the hardware and to manage virtual machines provisioned on the host devices. In other instances, "hosted" virtual machine managers may be provided that is run within the operating system of another host machine, including conventional operating system environments. Although virtual machine is discussed the methods systems are applicable to applications in one operating system environment. Lastly, virtual component can be programmed to perform application specific functions that may be associated with microcontroller, sensor, motors, actuators, lighting, or radio frequency identification (RFID).

Figure 3:
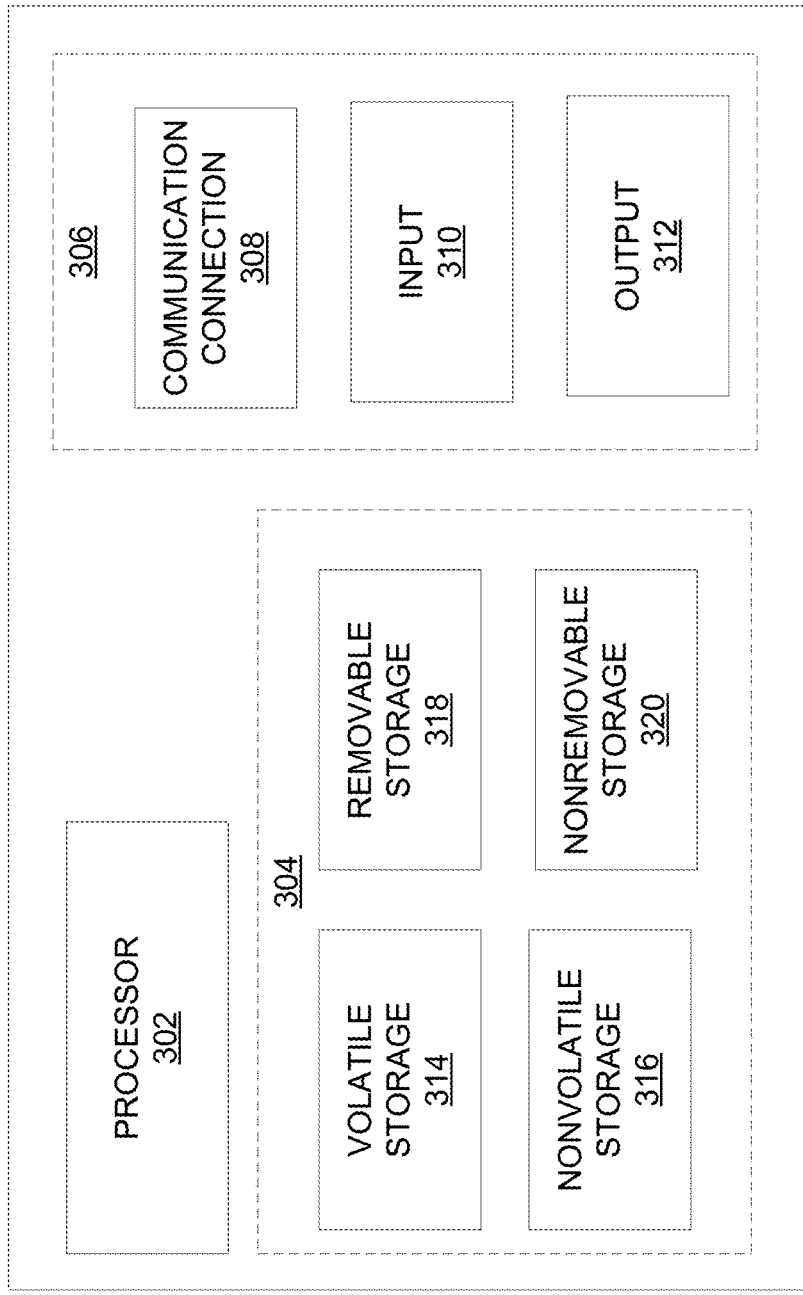
FIG. 3 illustrates a schematic of an exemplary network device.

FIG. 3 is a block diagram of network device 300 that may be connected to or comprise a component of system 100 associated with on-demand virtualization of robots. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
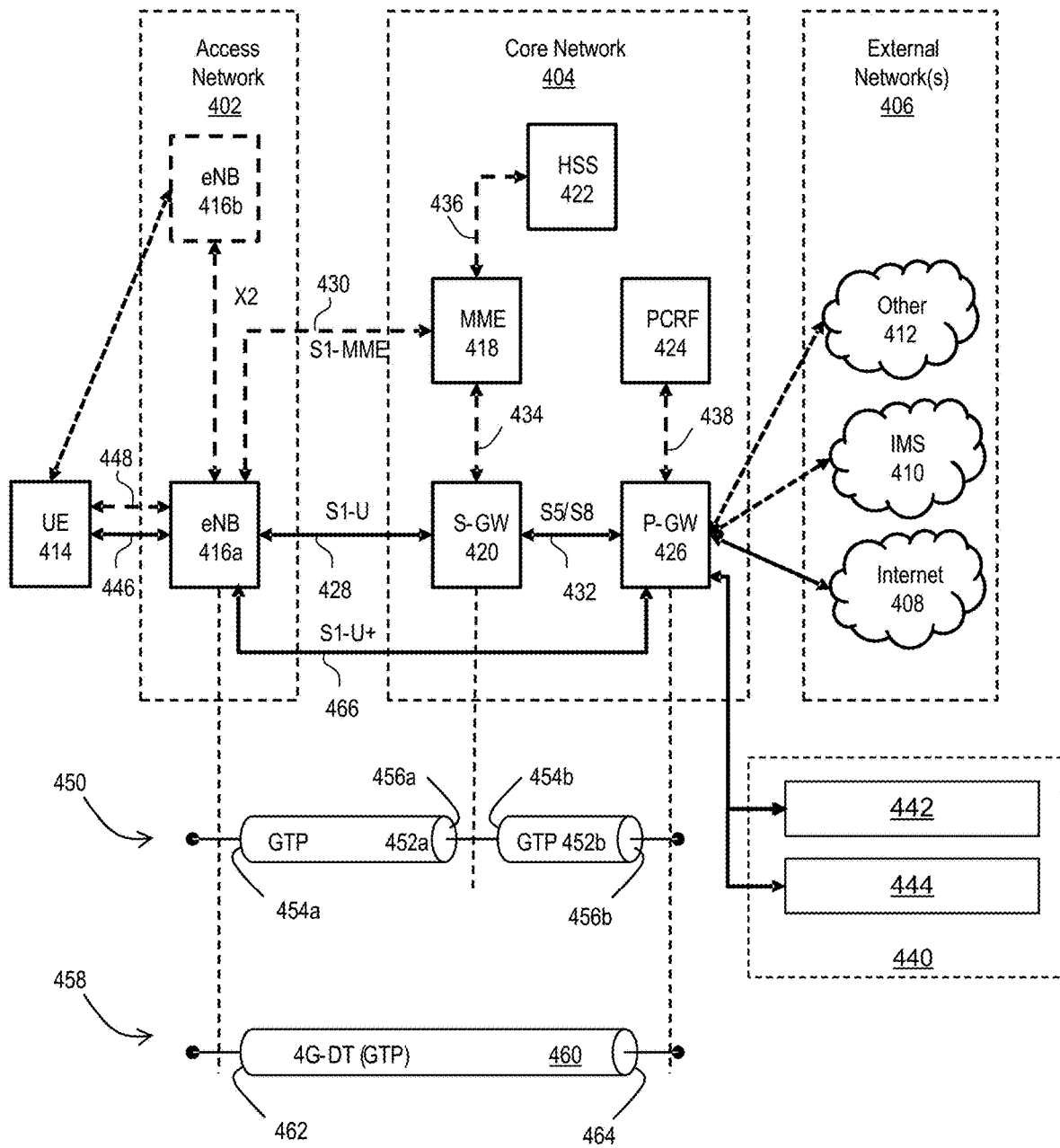
FIG. 4 illustrates an exemplary communication system that provides wireless telecommunication services over wireless communication networks.

FIG. 4 illustrates a functional block diagram depicting one example of an LTE-EPS network architecture 400 that may implement on-demand virtualization of robots. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416*a* to second eNB 416*b* as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416*a*.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
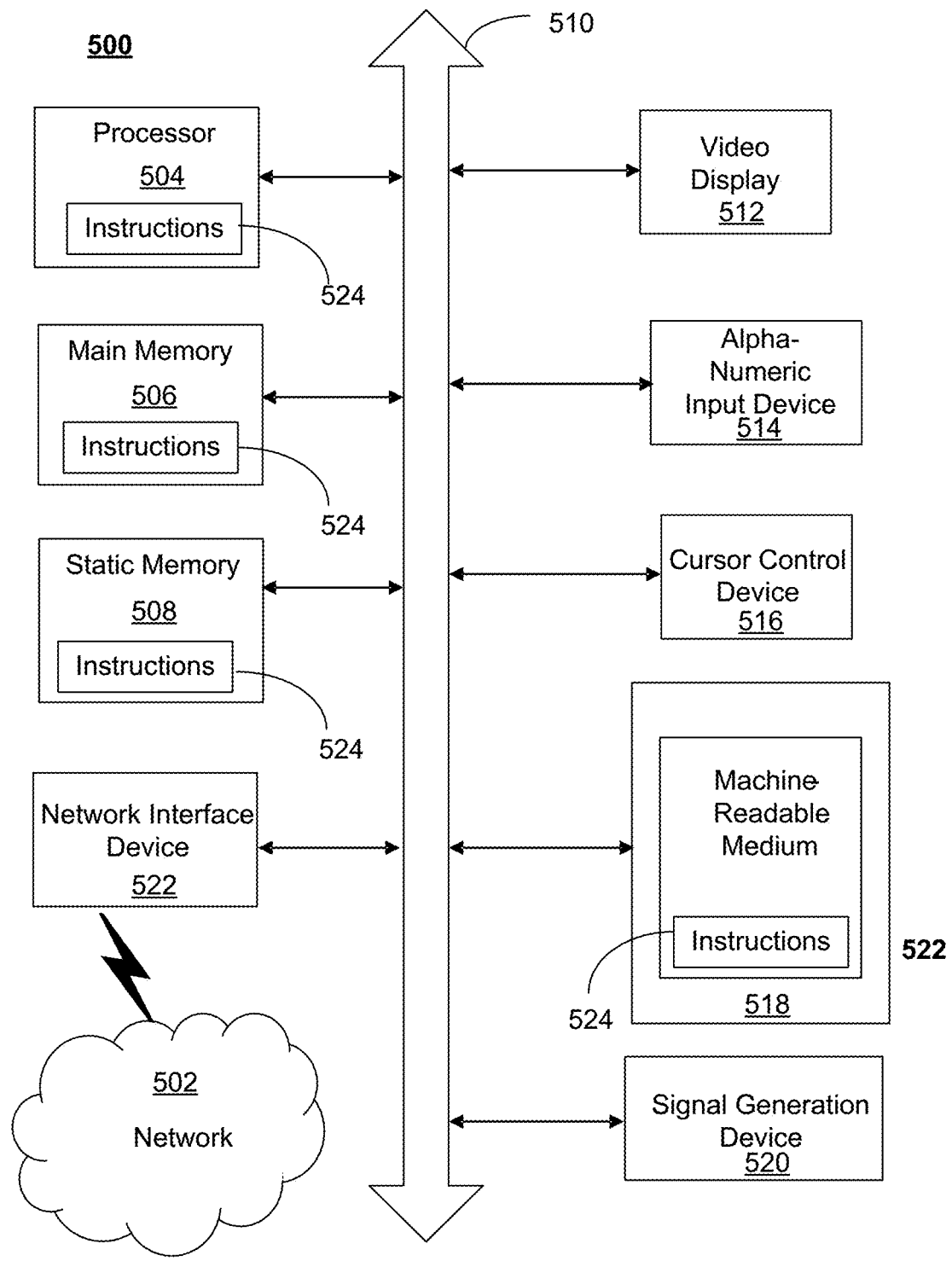
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods for on-demand virtualization of robots. One or more instances of the machine can operate, for example, as mobile device 108, robot 106, server, 102, processor 302, UE 414, eNB 416, MME 418, SGW 420, HSS 422, PCRF 424, PGW 426 and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
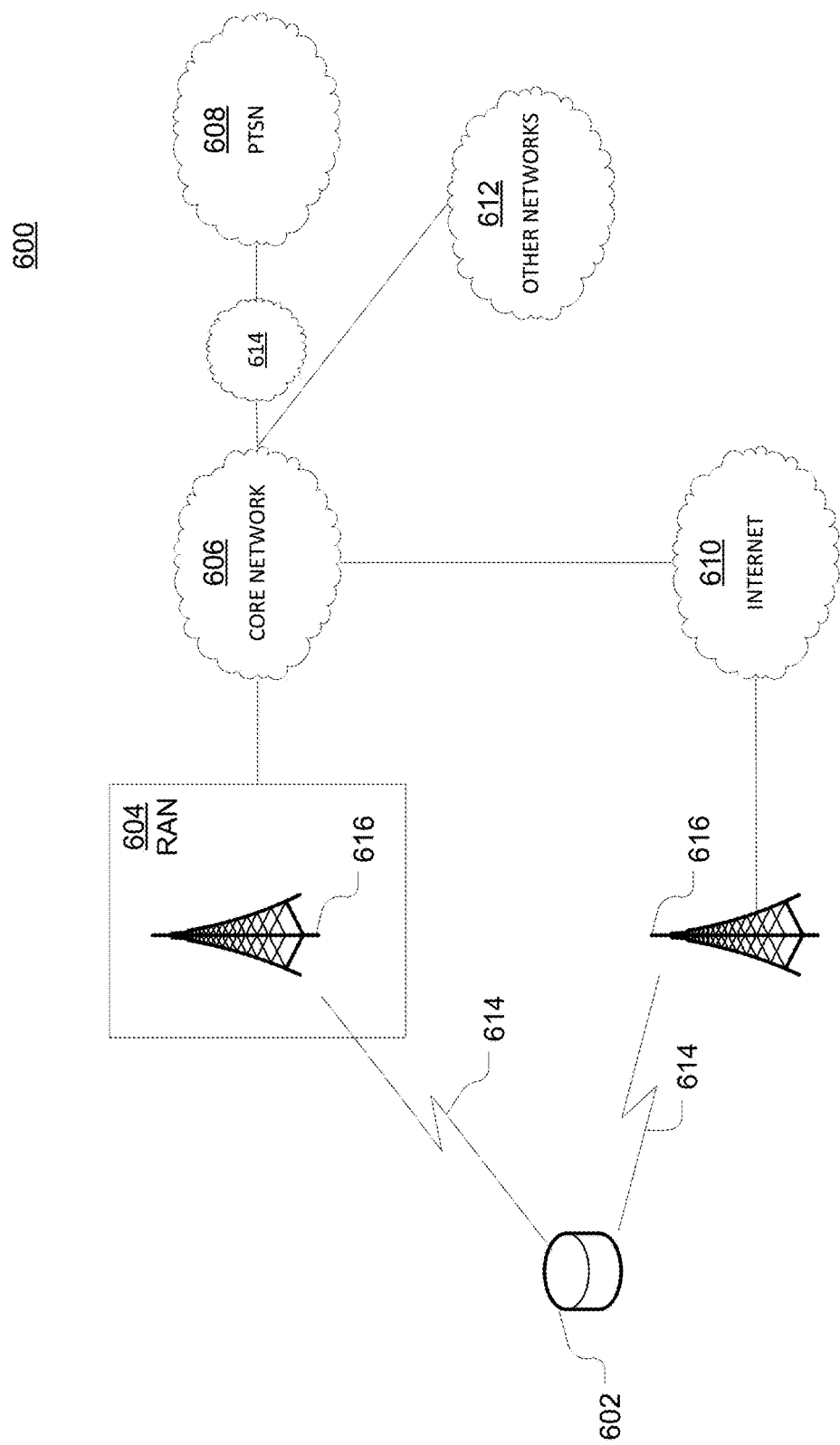
FIG. 6 illustrates an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise robot 106, mobile device 108, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
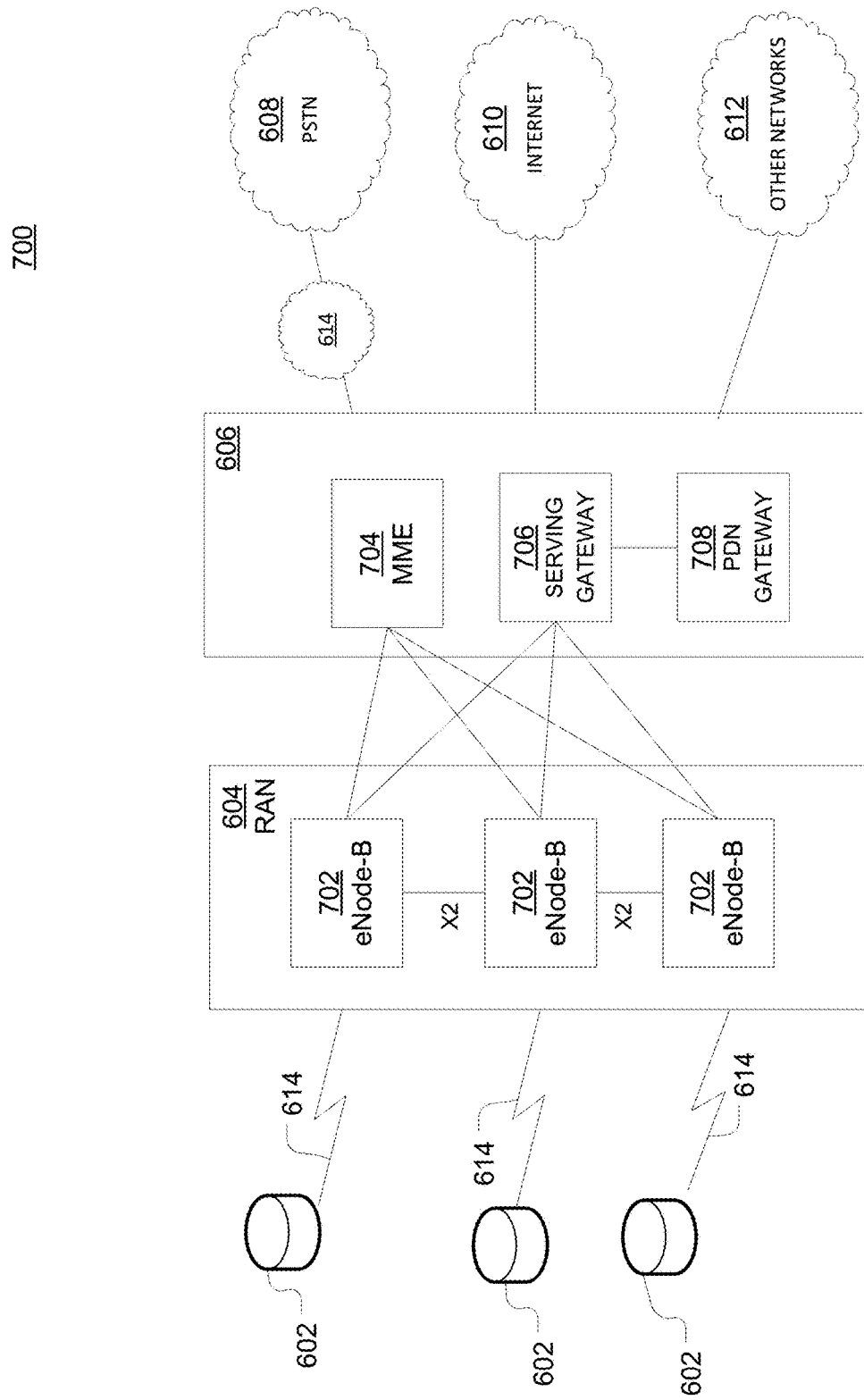
FIG. 7 illustrates an example system diagram of a radio access network and a core network.

FIG. 7 is an example system 400 including RAN 604 and core network 606 that may implement on-demand virtualization of robots. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
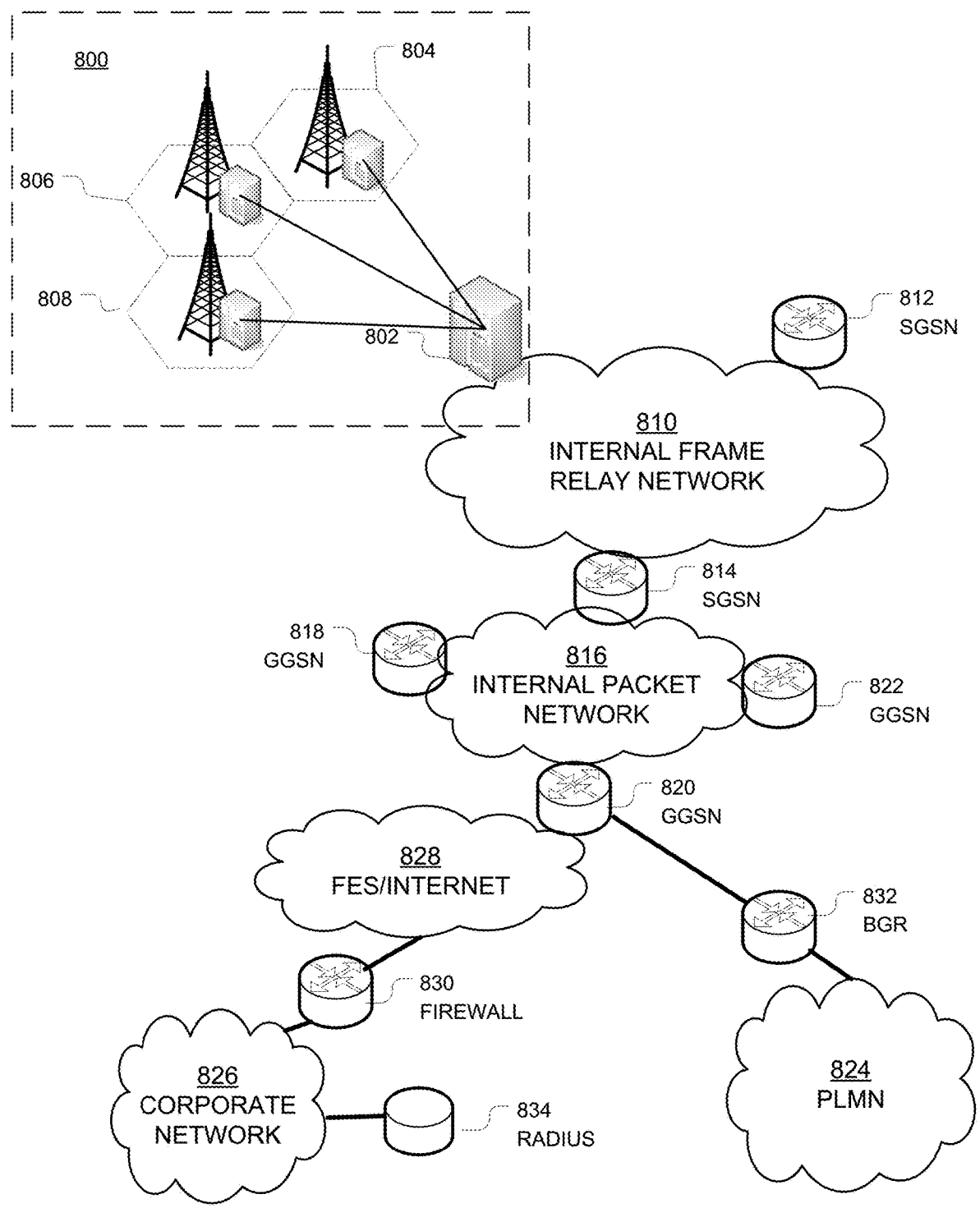
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network, that may implement on-demand virtualization of robots as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
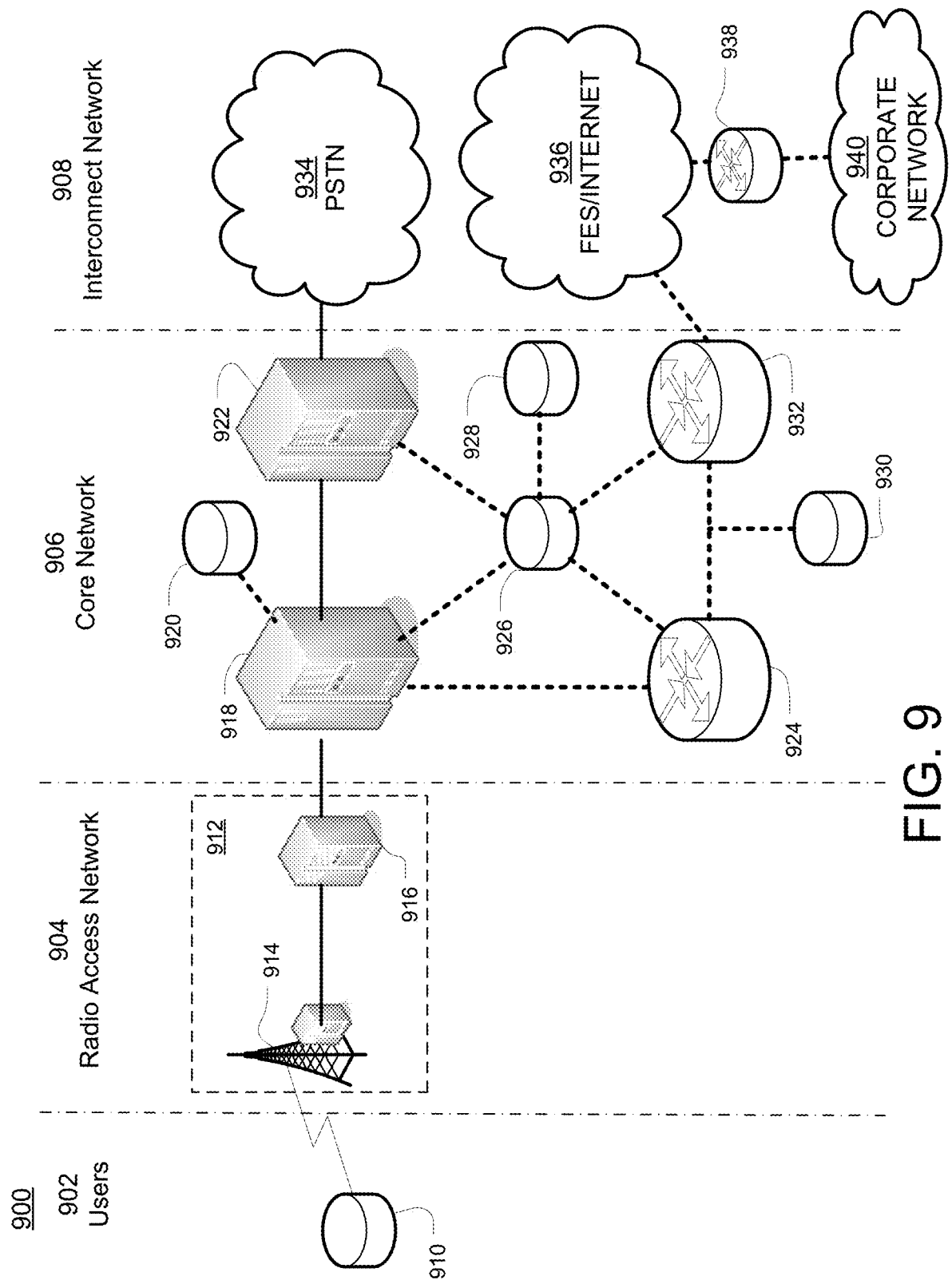
FIG. 9 illustrates an exemplary architecture of a GPRS network.

FIG. 9 illustrates an architecture of a typical GPRS network 900 that may implement on-demand virtualization of robots as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 108, robot 106, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
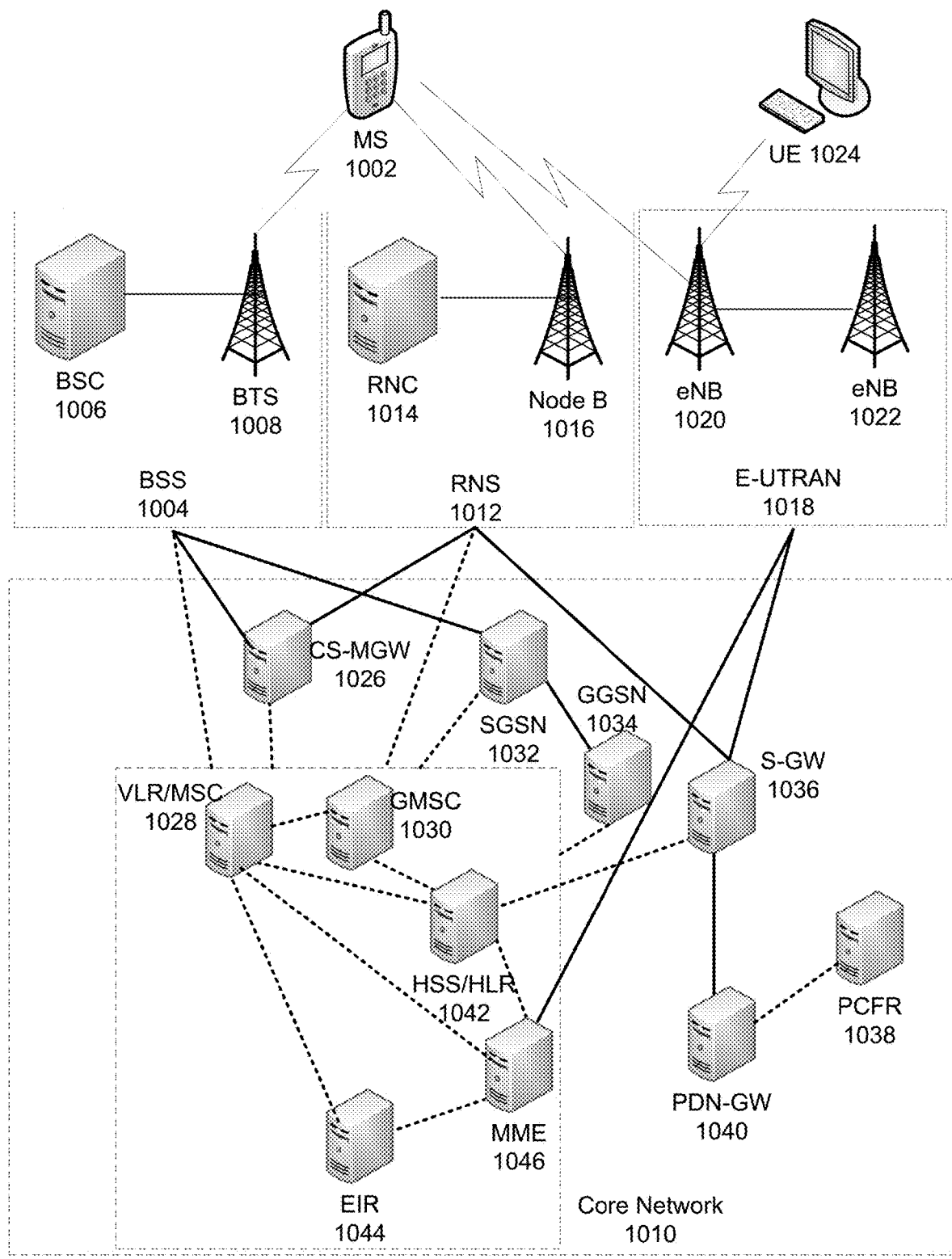
FIG. 10 is a block diagram of an exemplary public land mobile network (PLMN).

FIG. 10 illustrates a PLMN block diagram view of an example architecture of a telecommunications system that may be used by system 100 to implement on-demand virtualization of robots. In FIG. 10, solid lines may represent user traffic signals, and dashed lines may represent support signaling. MS 1002 is the physical equipment used by the PLMN subscriber. For example, robot 106, mobile device 108, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile phone, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—on-demand robot virtualization—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A system comprising:
   a robot, wherein the robot is autonomous and a physical extension of the virtual machine, wherein the robot is restricted to a particular set of virtual machines based on a geofence, wherein, based on the position of the robot in relation to the geofence, the robot performs actions comprising: shutting off, moving toward the center of the geofence, or stopping movement, the robot comprising:
      a first processor; and
      a first memory coupled with the first processor, the first memory storing executable instructions that when executed by the first processor cause the first processor to effectuate operations comprising:
         sending data to a server, the data comprising information from a sensor; based on the data from the sensor and the geofence, and
   the server communicatively connected with the robot, the server comprising:
      a second processor; and
      a second memory coupled with the second processor, the second memory comprising executable instructions that when executed by the second processor cause the second processor to effectuate operations comprising:
         receiving the data comprising the information from the sensor;
         based on the data, determining a type of event;
         based on the type of event, determining specifications for the robot; and
         based on the specifications for the robot, sending instructions to generate a virtual machine to control the robot, wherein the specifications are incorporated into the virtual machine.

2. The system of claim 1, wherein the robot is a physical extension of the virtual machine.

3. The system of claim 1, wherein the virtual machine is transferred to a mobile device.

4. The system of claim 3, wherein the robot is controlled via the virtual machine located on the mobile device.

5. The system of claim 1, the operations further comprising activating the virtual machine based on obtaining a payment.

6. The system of claim 1, wherein the data comprises an amount of people in an area.

7. The system of claim 1, wherein the data comprises current battery life of the robot or mobile device.

8. A robot comprising:
   a processor; and
   a memory coupled with the processor, the memory comprising executable instructions that when executed by the processor cause the processor to effectuate operations comprising:
      sending data to a server, the data comprising information from a sensor;
      responsive to sending the data to the server, receiving a virtual machine that was generated based on the data from the server; and
      activating the virtual machine to control the robot, wherein the robot is autonomous and a physical extension of the virtual machine, wherein the robot is restricted to a particular set of installed virtual machines based on a geofence, wherein, based on the position of the robot in relation to the geofence, the robot performs actions comprising: shutting off, moving toward the center of the geofence, or stop movement.

9. The robot of claim 8, wherein the robot is a physical extension of the virtual machine.

10. The robot of claim 8, wherein the virtual machine is transferred to a mobile device.

11. The robot of claim 10, wherein the robot is controlled via the virtual machine located on the mobile device.

12. The robot of claim 8, the operations further comprising activating the virtual machine based on obtaining a payment.

13. The robot of claim 8, wherein the information comprises an amount of people in an area.

14. The robot of claim 8, wherein the data comprises battery life of the robot or mobile device.

15. A computer readable storage medium storing computer executable instructions that when executed by a computing device cause said computing device to effectuate operations comprising:
   sending data to a server, the data comprising information from a sensor;
   responsive to sending the data to the server, receiving a virtual machine that was generated based on the data from the server; and
   activating the virtual machine to control a robot, wherein the robot is autonomous and a physical extension of the virtual machine, wherein the robot is restricted to a particular set of virtual machines based on a geofence, wherein, based on the position of the robot in relation to the geofence, the robot performs actions comprising: shutting off, moving toward the center of the geofence, or stopping movement.

16. The computer readable storage medium of claim 15, wherein the robot is a physical extension of the virtual machine.

17. The computer readable storage medium of claim 15, wherein the virtual machine is transferred to a mobile device.

18. The computer readable storage medium of claim 17, wherein the robot is controlled via the virtual machine located on the mobile device.

19. The computer readable storage medium of claim 15, the operations further comprising activating the virtual machine based on obtaining a payment.

20. The computer readable storage medium of claim 15, the operations further comprising receiving instructions that authorize a mobile device to activate the robot via near field communication.

* * * * *